(12) United States Patent
Portell et al.

(10) Patent No.: US 8,105,196 B2
(45) Date of Patent: Jan. 31, 2012

(54) AUTOMATIC TRANSMISSION GEAR AND CLUTCH ARRANGEMENT

(75) Inventors: Patrick S. Portell, Plymouth, MI (US); John A. Diemer, Farmington Hills, MI (US); James M. Hart, Belleville, MI (US); Scott H. Wittkopp, Ypsilanti, MI (US); Edwin T. Grochowski, Howell, MI (US); Douglas John Dwenger, Plymouth, MI (US); Elizabeth I. Wooden, Farmington Hills, MI (US); Boris Burgman, Oak Park, MI (US); Clinton E. Carey, Highland, MI (US); Tejinder Singh, Canton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 379 days.

(21) Appl. No.: 12/434,272

(22) Filed: May 1, 2009

(65) Prior Publication Data
US 2010/0279811 A1 Nov. 4, 2010

(51) Int. Cl.
*F16H 31/00* (2006.01)

(52) U.S. Cl. .................................... 475/116; 475/296
(58) Field of Classification Search .................. 475/116
See application file for complete search history.

(56) References Cited

U.S. PATENT DOCUMENTS

| 4,033,203 A * | 7/1977 | Hirosawa et al. ............. 477/151 |
| 4,676,116 A * | 6/1987 | Nerstad et al. .................. 74/360 |
| 6,960,146 B2 * | 11/2005 | Haka ............................ 475/116 |
| 7,699,741 B2 | 4/2010 | Hart et al. |
| 2007/0026990 A1 * | 2/2007 | Takagi ........................... 475/116 |
| 2009/0247343 A1 | 10/2009 | Hart et al. |

\* cited by examiner

*Primary Examiner* — Roger Pang
*Assistant Examiner* — Erin D Bishop

(57) ABSTRACT

A transmission is provided having an input member, an output member, four planetary gear sets, a plurality of coupling members and a plurality of torque-transmitting devices. Further, a hydraulic fluid control circuit is provided for controlling the operation of the plurality of torque-transmitting devices. The hydraulic fluid control circuit receives pressurized hydraulic fluid from an off-axis hydraulic fluid pump and has a plurality of fluid passages disposed in the transmission house, input member and other coupling members.

20 Claims, 5 Drawing Sheets

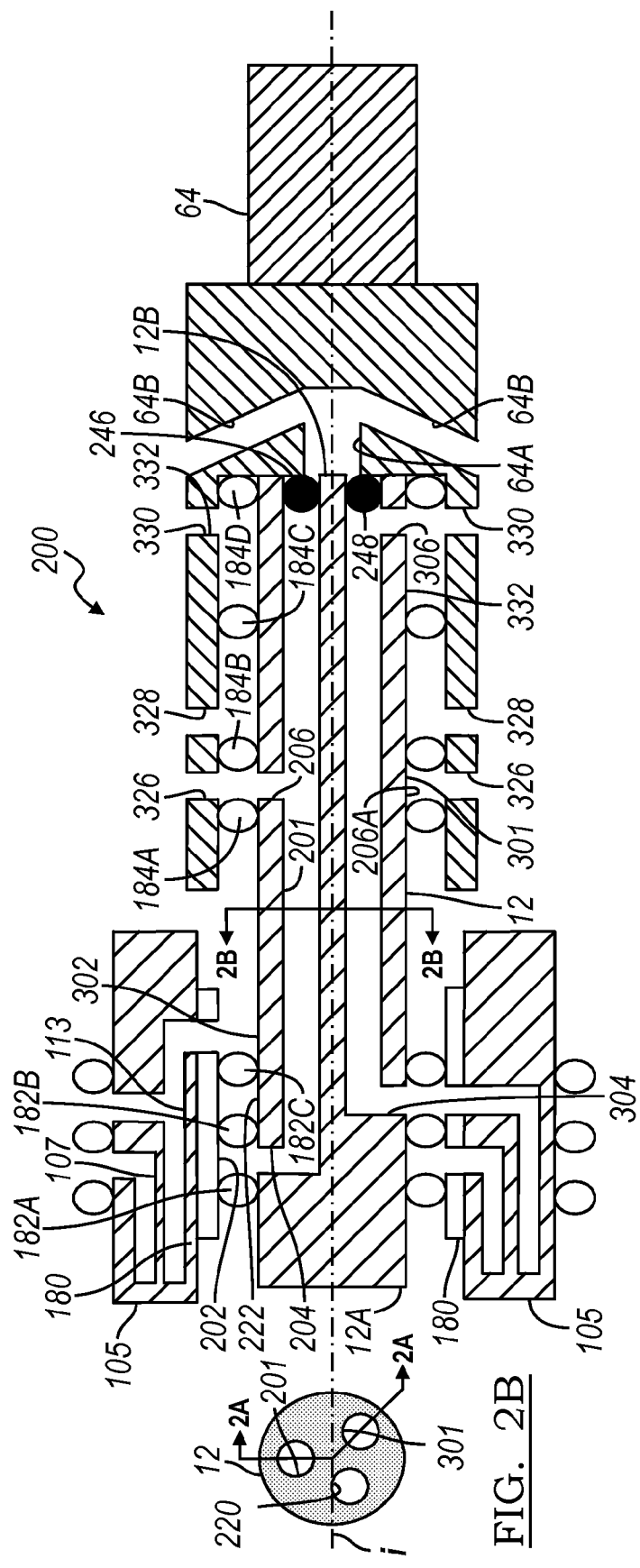

AUTOMATIC TRANSMISSION GEAR AND CLUTCH ARRANGEMENT

FIELD

The present invention relates generally to multiple speed transmissions having a plurality of planetary gear sets and a plurality of torque-transmitting devices and more particularly to a hydraulic control circuit for controlling the operation of the plurality of torque-transmitting devices.

BACKGROUND

The statements in this section merely provide background information related to the present disclosure and may or may not constitute prior art.

A typical multiple speed transmission uses a combination of friction clutches, planetary gear arrangements and fixed interconnections to achieve a plurality of gear ratios. The number and physical arrangement of the planetary gear sets, generally, are dictated by packaging, cost and desired speed ratios.

While current transmissions achieve their intended purpose, the need for new and improved transmission configurations which exhibit improved control systems is essentially constant. More efficient hydraulic controls require less energy and provide improved performance, weight efficiency and driver satisfaction. Accordingly, there is a need for an improved, cost-effective, compact multiple speed transmission.

SUMMARY

A transmission is provided having an input member, an output member, four planetary gear sets, a plurality of coupling members and a plurality of torque transmitting devices. Each of the planetary gear sets includes first, second and third members. The torque transmitting devices are for example clutches and brakes.

An embodiment of the transmission is provided having a transmission housing having a center support and a front support. The center support includes a first apply fluid passage, a second apply fluid passage, a third apply fluid passage, and a first dam fluid passage. The front support includes a fourth apply fluid passage and a second dam fluid passage. The transmission further includes a first, a second, a third, and a fourth planetary gear sets each having a first, a second, and a third members. The transmission further includes five torque-transmitting mechanisms each having an apply chamber and a piston for selectively interconnecting at least one of the first, second, and third members with at least one other of the first members, second members, third members, and the transmission housing. The first apply fluid passage is in communication with a first apply chamber of the first of the five torque-transmitting mechanisms. The second apply fluid passage is in communication with a second apply chamber of the first of the five torque-transmitting mechanisms. The first dam fluid passage is in communication with the dam chamber of the first of the five torque-transmitting mechanisms. The third apply fluid passage is in communication with the apply chamber of the second of the five torque-transmitting mechanisms. The fourth apply fluid passage is in communication with the apply chamber of the third of the five torque-transmitting mechanisms. The second dam fluid passage is in communication with the dam chamber of the third of the five torque-transmitting mechanisms. The transmission further includes an input member continuously interconnected to the second member of the second planetary gear set. The input member has a first, a second, and a third bore disposed parallel to a longitudinal axis of the input member. The input member further has a first port in communication with the first bore and a second port in communication with the third bore, a first and second dam port in communication with the second bore, a first apply port in communication with the first bore, and a second apply port in communication with the third bore. The transmission further includes an output member continuously interconnected to at least one of the second member of the fourth planetary gear set and the second member of the third planetary gear set. The transmission further includes an intermediate member rotatably fixed to the first member of the fourth planetary gear set. The intermediate member has an intermediate bore in communication with the second bore of the input shaft, a first apply side port in communication with the apply chamber of the fourth of the five torque-transmitting mechanisms, a second apply side port in communication with the apply chamber of the fifth of the five torque-transmitting mechanisms, a first dam side port in communication with the dam chamber of the fourth of the five torque-transmitting mechanisms, and a second dam side port in communication with the dam chamber of the fifth of the five torque-transmitting mechanisms and the intermediate bore. The transmission further includes a first interconnecting member continuously interconnecting the first member of the first planetary gear set with the first member of the second planetary gear set, a second interconnecting member continuously interconnecting the second member of the first planetary gear set with the third member of the fourth planetary gear set, a third interconnecting member continuously interconnecting the third member of the second planetary gear set with the first member of the third planetary gear set, and a fourth interconnecting member continuously interconnecting the second member of the third planetary gear set with the second member of the fourth planetary gear set.

In another aspect of the present invention, the first of the five torque-transmitting mechanisms is selectively engageable to interconnect the third member of the first planetary gear set with the stationary element. The second of the five torque-transmitting mechanisms is selectively engageable to interconnect at least one of the first member of the first planetary gear set and the first member of the second planetary gear set with the stationary element. The third of the five torque-transmitting mechanisms is selectively engageable to interconnect at least one of the second member of the second planetary gear set and the input member with the first member of the fourth planetary gear set. The fourth of the five torque-transmitting mechanisms is selectively engageable to interconnect at least one of the third member of the second planetary gear set and the first member of the third planetary gear set with the first member of the fourth planetary gear set. The fifth of the five torque-transmitting mechanisms is selectively engageable to interconnect the third member of the third planetary gear set with the first member of the fourth planetary gear set. The five torque-transmitting mechanisms include a first and second brake and a first, a second, and a third clutch.

In yet another aspect of the present invention, the torque-transmitting mechanisms are selectively engageable in combinations of at least three to establish at least eight forward speed ratios and at least one reverse speed ratio between the input member and the output member.

In yet another aspect of the present invention, the transmission further comprises a sleeve shaft supported by the front support of the transmission housing, a plurality of input member seals, a first annular channel, a second annular channel, and a third annular channel. The annular channels are defined by the inner surface of the sleeve shaft, the outer surface of the input member, and the plurality of input member seals. The first annular channel communicates with the first port, the second annular channel communicates with the second port, and the third annular channel communicates with the first dam port and the second dam fluid passage of the front support.

In yet another aspect of the present invention, the transmission further comprises a plurality of intermediate member seals, a fourth annular channel, a fifth annular channel, and a sixth annular channel. The annular channels are defined by the outer surface of the input member, the inner surface of the intermediate shaft, and the plurality of intermediate member seals. The fourth annular channel communicates with the first apply port and the first apply side port of the intermediate member, the fifth annular channel communicates with the second dam port and the first dam side port of the intermediate member, and the sixth annular channel communicates with the second apply port and the second apply side port of the intermediate member.

In yet another aspect of the present invention, the transmission further comprises a hydraulic fluid pump fixed to the transmission housing and drivingly connected to a torque converter or an engine. The hydraulic fluid pump provides a pressurized hydraulic fluid to a hydraulic control system of the transmission.

In yet another aspect of the present invention, the transmission further comprises a first speed sensor assembly, a second speed sensor assembly, and a third speed sensor assembly each having a speed sensor fixed to the transmission housing and a speed sensor ring rotatably fixed to at least one of the interconnecting members, the input member, and the output member.

In yet another aspect of the present invention, the first speed sensor assembly has a first speed sensor ring rotatably fixed to the input member, the second speed sensor assembly has a second speed sensor ring rotatably fixed to the second interconnecting member, and the third speed sensor assembly has a third speed sensor ring rotatably fixed to the output member.

Further objects, aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way;

FIG. 2A is a cross section of an input shaft and a shaft or interconnecting member illustrating a fluid routing system for an eight speed transmission in accordance with an embodiment of the present invention;

FIG. 2B is a cross section of the input shaft taken along the line 2B-2B in FIG. 2A;

DETAILED DESCRIPTION

The following description is merely exemplary in nature and is not intended to limit the present disclosure, application, or uses.

Figure 1:
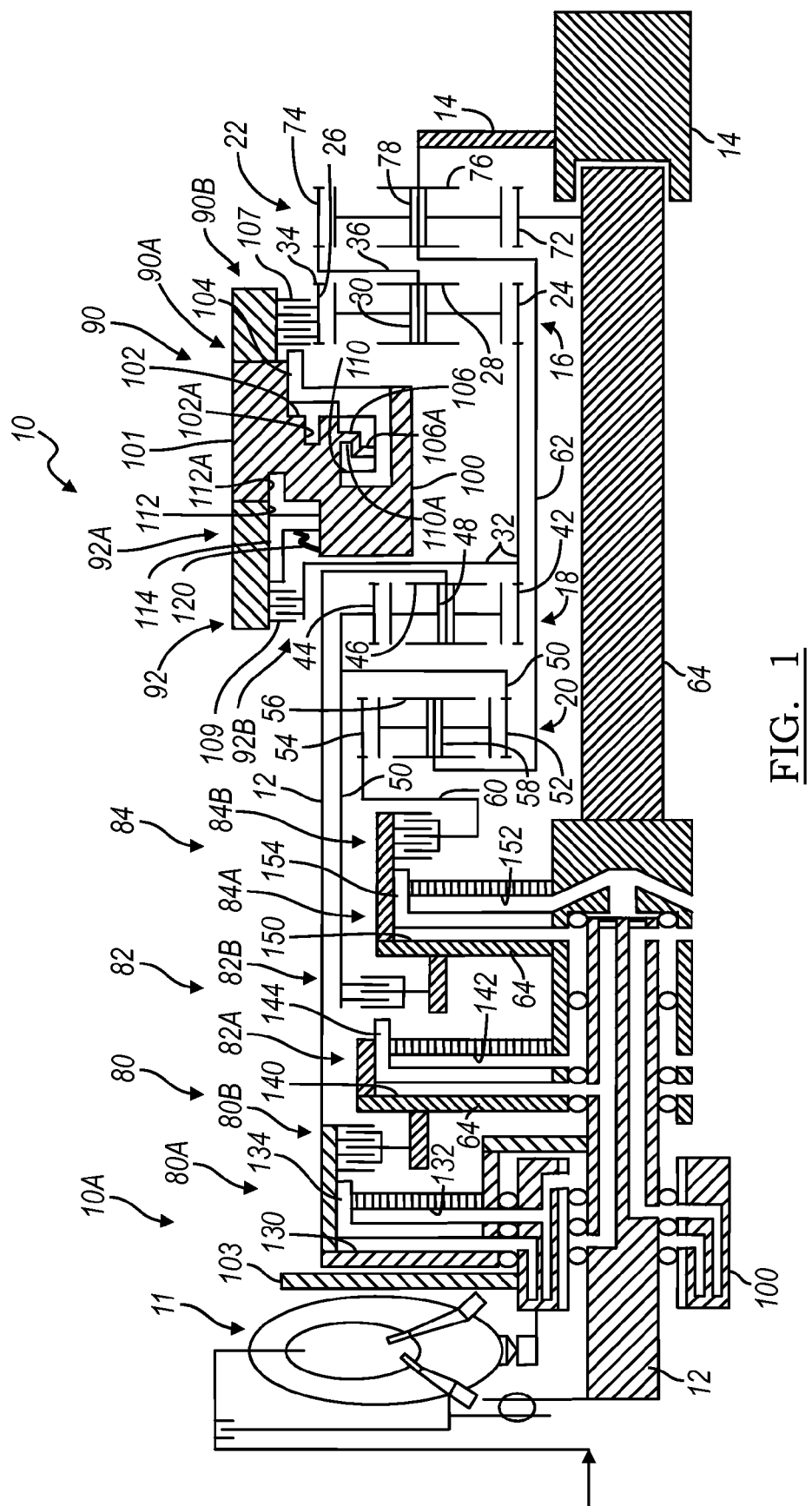
FIG. 1 is a schematic view of an embodiment of an eight speed transmission according to the present invention.

Referring to the drawings, wherein like reference numbers refer to like components, in FIG. 1 a multi-speed transmission 10 is illustrated. The transmission 10 includes an input member 12 and an output member 14. In the present embodiment, input member 12 and output member 14 are shafts, and will be referred to as such. Those skilled in the art will appreciate that the input and output members 12, 14 may be components other than shafts. The input shaft 12 is continuously connected to an engine (not shown) or torque converter 11. The output shaft 14 is continuously connected with the final drive unit or transfer case (not shown).

In a preferred embodiment of the present invention, the transmission 10 includes four planetary gear sets 16, 18, 20 and 22. The planetary gear sets 16, 18, 20 and 22 are connected between the input shaft 12 and the output shaft 14.

The first planetary gear set 16 includes a sun gear member 24, a ring gear member 26 and a carrier member 28 that rotatably supports a set of planet gears 30. Sun gear member 24 is connected for common rotation with a first shaft or interconnecting member 32. Ring gear member 26 is connected for common rotation with a second shaft or interconnecting member 34. Carrier member 28 is connected for common rotation with a third shaft or member 36. Planet gears 30 are each configured to intermesh with both the sun gear member 24 and the ring gear member 26.

The second planetary gear set 18 includes a sun gear member 42, a ring gear member 44 and a carrier member 46 that rotatably supports a set of planet gears 48. Sun gear member 42 is connected for common rotation with the first shaft or interconnecting member 32. Ring gear member 44 is connected for common rotation with a fourth shaft or interconnecting member 50. Carrier member 46 is connected for common rotation with the input shaft 12. Planet gears 48 are each configured to intermesh with both the sun gear member 42 and the ring gear member 44.

The third planetary gear set 20 includes a sun gear member 52, a ring gear member 54 and a carrier member 56 that rotatably supports a set of planet gears 58. Sun gear member 52 is connected for common rotation with the fourth shaft or interconnecting member 50. Ring gear member 54 is connected for common rotation with a fifth shaft or interconnecting member 60. Carrier member 56 is connected for common rotation with a sixth shaft or interconnecting member 62. Planet gears 58 are each configured to intermesh with both the sun gear member 52 and the ring gear member 54.

The fourth planetary gear set 22 includes a sun gear member 72, a ring gear member 74 and a carrier member 76 that rotatably supports a set of planet gears 78. Sun gear member 72 is connected for common rotation with a seventh shaft or interconnecting member 64. Ring gear member 74 is connected for common rotation with the third shaft or interconnecting member 36. Carrier member 76 is connected for common rotation with the output shaft 14 and the sixth shaft or interconnecting member 62. Planet gears 78 are each configured to intermesh with both the sun gear member 72 and the ring gear member 74.

The transmission 10 includes a variety of torque-transmitting mechanisms or devices allowing for selective coupling of shafts or interconnecting members, members of the planetary gear sets and the transmission housing 100. More specifically, transmission 10 includes a first clutch 80, a second clutch 82, a third clutch 84, a first brake 90 and a second brake 92. For example, first clutch 80 is selectively engageable to connect the seventh shaft or interconnecting member 64 to the input shaft 12. Second clutch 82 is selectively engagable to connect the seventh shaft or interconnecting member 64 to the fourth shaft or interconnecting member 50. Third clutch 84 is selectively engagable to connect the fifth shaft or interconnecting member 60 to the seventh shaft or interconnecting member 64. First brake 90 is selectively engagable to connect the second shaft or interconnecting member 34 to the transmission housing 100 to restrict rotation of the second shaft or interconnecting member 34 relative to the transmission housing 100. Second brake 92 is selectively engagable to connect the first shaft or interconnecting member 32 to a transmission housing 100 to restrict rotation of the first shaft or interconnecting member 32 relative to the transmission housing 100.

The transmission 10 is capable of transmitting torque from the input shaft 12 to the output shaft 14 in at least eight forward torque ratios and one reverse torque ratio. Each of the forward torque ratios and the reverse torque ratios are attained by engagement of one or more of the torque-transmitting mechanisms (i.e. first clutch 80, second clutch 82, third clutch 84, first brake 90 and second brake 92). Those skilled in the art will readily understand that a different speed ratio is associated with each torque ratio. Thus, at least eight forward speed ratios and at least one reverse speed ratio may be attained by the transmission 10.

With continuing reference to FIG. 1, the location of the brakes 90, 92 and clutches 80, 82, 84 along the input shaft 12 and relative to the planetary gear sets 16, 18, 20, 22 will now be described. The first and second brakes 90, 92 are arranged coaxially with the input shaft 12 and the first brake 90 is disposed axially rearward of the second brake 92. The torque converter 11 is disposed at a front end 10A of the transmission 10. The first and second brakes 90, 92 are supported by a center support assembly 101 of the transmission housing 100. The center support assembly 101 is located between the second planetary gear set 18 and the first planetary gear set 16. The first brake 90 includes an actuating assembly 90A and a clutch pack 90B. The actuating assembly 90A of the first brake 90 includes a brake piston 104, a first apply chamber 102, a second apply chamber 106, and a dam chamber 110. The clutch pack 90B of the first brake 90 includes a plurality of clutch plates 107 secured to the center support 101. Upon pressurization of the apply chambers 102, 106, the brake piston 104 is forced to engage the clutch plates 107 and the second shaft or interconnecting member 34. The second brake 92 includes an actuating assembly 92A and a clutch pack 92B. The actuating assembly 92A of the second brake 92 includes a brake piston 114, an apply chamber 112 and a spring 120. The clutch pack 92B of the second brake 92 includes a plurality of clutch plates 109 secured to the center support 101. Upon pressurization of the apply chamber 112, the brake piston 114 is forced to engage the clutch plates 109 and the first shaft or interconnecting member 32.

The center support 101 of the transmission housing 100 further includes a first apply fluid passage 102A, a second apply fluid passage 106A, a third apply fluid passage 112A and a first dam fluid passage 110A. The first apply fluid passage 102A is in communication with the first apply chamber 102 of the first brake 90. The second apply fluid passage 106A is in communication with the second apply chamber 106 of the first brake 90. The first dam fluid passage 110A is in communication with the dam chamber 110 of the first brake 90. The third apply fluid passage 112A is in communication with the apply chamber 112 of the second brake 92.

The first, second, and third clutches 80, 82, 84 are arranged coaxially with the input shaft 12. The first clutch 80, second clutch 82, and third clutch 84 are disposed between a front wall 103 of the transmission housing 100 and the third planetary gear set 20. More specifically, the first clutch 80 is adjacent the front wall 103, the third clutch 84 is adjacent the third planetary gear set 20, and the second clutch 82 is disposed between the first and third clutches 80, 84.

The first clutch 80 includes an actuating assembly 80A and a clutch pack 80B. The actuating assembly 80A of the first clutch 80 includes an apply chamber 130, a dam chamber 132 and a piston 134. The actuating assembly 80A is supported by and rotatably fixed to the input shaft 12. The clutch pack 80B includes a plurality of alternating friction disks or rings. The piston 134 of the actuating assembly 80A engages the clutch pack 80B to force the plurality of alternating friction disks together to interconnect the planet carrier 46 of the second planetary gear set 18 and input shaft 12 with the seventh shaft or interconnecting member 64.

The second clutch 82 includes an actuating assembly 82A and a clutch pack 82B. The actuating assembly 82A of the first clutch 82 includes an apply chamber 140, a dam chamber 142 and a piston 144. The actuating assembly 82A is supported rigidly by the seventh shaft or interconnecting member 64. The clutch pack 82B includes a plurality of alternating friction disks or rings. The piston 144 of the actuating assembly 82A engages the clutch pack 82B to interconnect the seventh shaft or interconnecting member 64 and the fourth shaft or interconnecting member 50.

The third clutch 84 includes an actuating assembly 84A and a clutch pack 84B. The actuating assembly 84A of the first clutch 84 includes an apply chamber 150, a dam chamber 152 and a piston 154. The actuating assembly 84A is supported rigidly by the seventh shaft or interconnecting member 64. The clutch pack 84B includes a plurality of alternating friction disks or rings. The piston 154 of the actuating assembly 84A engages the clutch pack 84B to interconnect the seventh shaft or interconnecting member 64 and the fifth shaft or interconnecting member 60.

Figures 3A, 3B:
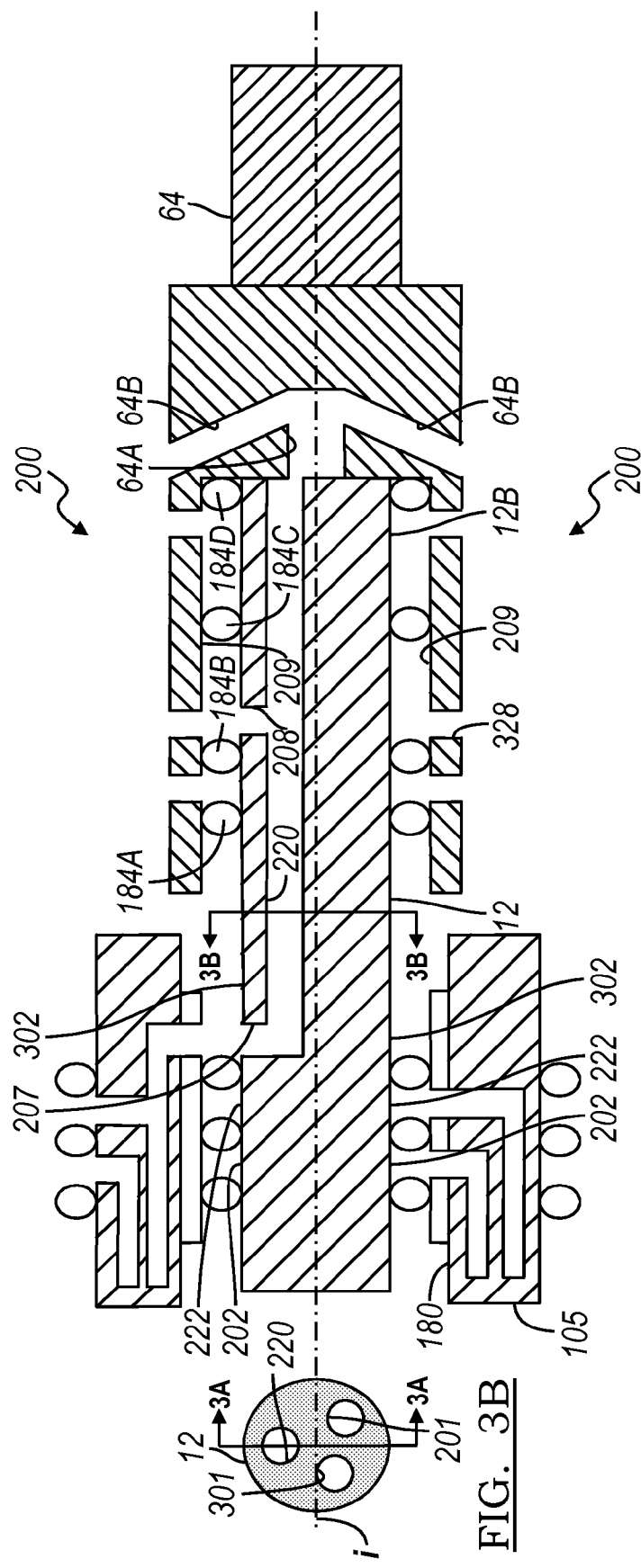
FIG. 3A is a cross section of the input shaft and the shaft or interconnecting member illustrating a fluid routing system for an eight speed transmission in accordance with an embodiment of the present invention wherein the cross section is axially rotated 120° from the cross section taken in FIG. 2A.
FIG. 3B is a cross section of the input shaft taken along the line 3B-3B in FIG. 3A.

Referring now to FIGS. 2A, 2B, 3A and 3B, cross-sectional views of the input shaft 12 and the seventh shaft or interconnecting member 64 are illustrated depicting a hydraulic control circuit 200, in accordance with an embodiment of the present invention. Hydraulic control circuit 200 contains hydraulic fluid that is pressurized by a hydraulic fluid pump (not shown) and generates hydraulic control signals to actuate the first, second and third clutches 80, 82, 84 and first and second brakes 90, 92 (FIG. 1). The hydraulic control circuit 200 includes three bores disposed in the input shaft 12: a first bore 201, a second bore 220, and a third bore 301. In one aspect of the present invention, the first, second, and third bores 201, 220, 301 are disposed longitudinally in the input shaft 12. Each bore 201, 220, 301 is disposed 120° from the adjacent bore 201, 220, 301 as shown in FIGS. 2B and 3B. The hydraulic control circuit 200 also includes three annular channels 202, 222, 302 formed by a sleeve shaft 180, the input shaft 12, and a plurality of input shaft seals 182A-C. The sleeve shaft 180 is fixedly attached to the front support 105 of the transmission housing 100. The first annular channel 202 is defined by the outer surface of the input shaft 12, the inner surface of the sleeve shaft 180 and the side surfaces of a first input shaft seal 182A and a second input shaft seal 182B. The second annular channel 222 is defined by the outer surface of the input shaft 12, the inner surface of a sleeve shaft 180 and the side surfaces of the second input shaft seal 182B and a third input shaft seal 182C. The third annular channel 302 is defined by the outer surface of the input shaft 12, the inner surface of a sleeve shaft 180 and the side surfaces of the third input shaft seal 182C and seal 184A.

The hydraulic circuit 200 further includes a fourth apply fluid passage 107 and a second dam fluid passage 113 contained within the front support 105 of the transmission housing 100. The fourth apply fluid passage 107 is in communication with the apply chamber 130 of the first clutch 80 (see FIG. 1). The second dam fluid passage 113 is in communication with the dam chamber 132 of the first clutch 80 (see FIG. 1) and the third annular channel 302.

The three input shaft seals 182A-C are disposed coaxially with the input shaft 12 between the sleeve shaft 180 and the input shaft 12 and seals a first end 12A of the input shaft 12. The first and second annular channels 202, 222 communicate, respectively, with the first and third bores 201, 301 through first and third ports 204, 304 formed in the first end 12A of the input shaft 12.

The first bore 201 contains a first plug 246 fixedly disposed at the second end 12B of the input shaft 12 to seal the first bore 201. The first bore 201 communicates with the apply chamber 140 of the second clutch 82 (see FIG. 1) through a first apply port 206 of the input shaft 12, a fourth annular channel 206A and a first apply side port 326 of the seventh shaft or interconnecting member 64. The fourth annular channel 206A is formed by the outer surface of the input shaft 12, the inner surface of the seventh shaft or interconnecting member 64 and the side surfaces of a first and a second intermediate seal 184A, 184B.

The second bore 220 communicates with the second dam fluid passage 113 through a first dam port 207 and the third annular channel 302. The second bore 220 also communicates with the dam chamber 142 of the second clutch 82 (see FIG. 1) through the second dam port 208, a fifth annular channel 209, and a first dam side port 328 of the seventh shaft or interconnecting member 64. The fifth annular channel 209 is formed by the outer surface of the input shaft 12, the inner surface of the seventh shaft or interconnecting member 64 and the side surfaces of a second and a third intermediate seal 184B, 184C. The second bore 220 is open at a second end 12B of the input shaft 12 communicating with an intermediate bore 64A disposed in the seventh shaft or interconnecting member 64. The seventh shaft or interconnecting member 64 includes a second dam side port 64B that communicate with the intermediate bore 64A and the dam chamber 152 of the third clutch 84 (see FIG. 1).

The third bore 301 contains a second plug 248 fixedly disposed at the second end 12B of the input shaft 12 to seal the third bore 301. The third bore 301 communicates with the apply chamber 150 of the third clutch 84 (see FIG. 1) through a second apply port 306 of the input shaft 12, a sixth annular channel 332, and a second apply side port 330 of the seventh shaft or interconnecting member 64. The sixth annular channel 332 is formed by the outer surface of the input shaft 12, the inner surface of the seventh shaft or interconnecting member 64 and the side surfaces of a third and a fourth intermediate seal 184C, 184D.

Figure 4:
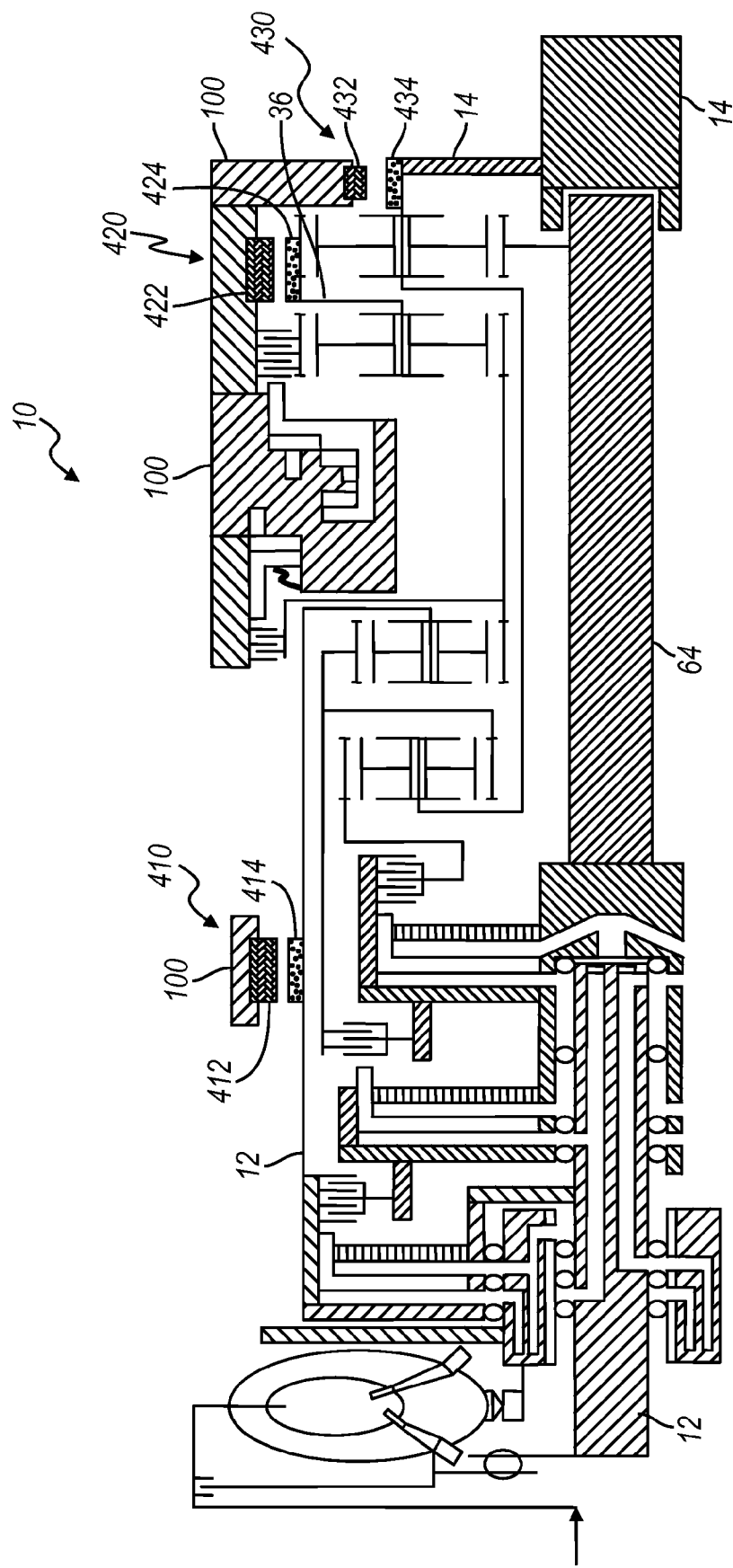
FIG. 4 is a diagram showing speed sensor locations for providing an intermediate speed sensor.

Referring now to FIG. 4, a cross section of the transmission 10 is illustrated showing locations for three speed sensor assemblies 410, 420, 430. The speed sensors 412, 422, 432 are fixedly attached to the transmission housing 100. The speed sensors 412, 422, 432 are conventional speed sensors such as Hall Effect sensors or variable reluctance sensors and the like. The speed sensor rings 414, 424, 434 are in close proximity to the speed sensors 412, 422, 432 and are fixedly attached to one of the rotatable shafts or members of transmission 10. The speed sensors 412, 422, 432 detect the presence of the respective speed sensor ring 414, 423, 434 to count the revolutions of the shaft or interconnecting member to which the speed sensor ring 414, 424, 434 is attached. Alternatively, the speed sensor rings 414, 424, 434 are magnetic strips or toothed portions of shafts having magnetic material formed in the rotatable shafts or members of transmission 10.

For example, the first speed sensor 412 is fixedly attached to the transmission housing 100 and the first speed sensor ring 414 is fixedly disposed on the input shaft 12. The second speed sensor 422 is fixedly disposed on the transmission housing 100 and the second speed ring 424 is fixedly disposed on the third shaft or member 36. The third speed sensor 432 is fixedly disposed on the transmission housing 100 and the third speed sensor ring 434 is fixedly disposed on the output shaft 14.

Figure 5:
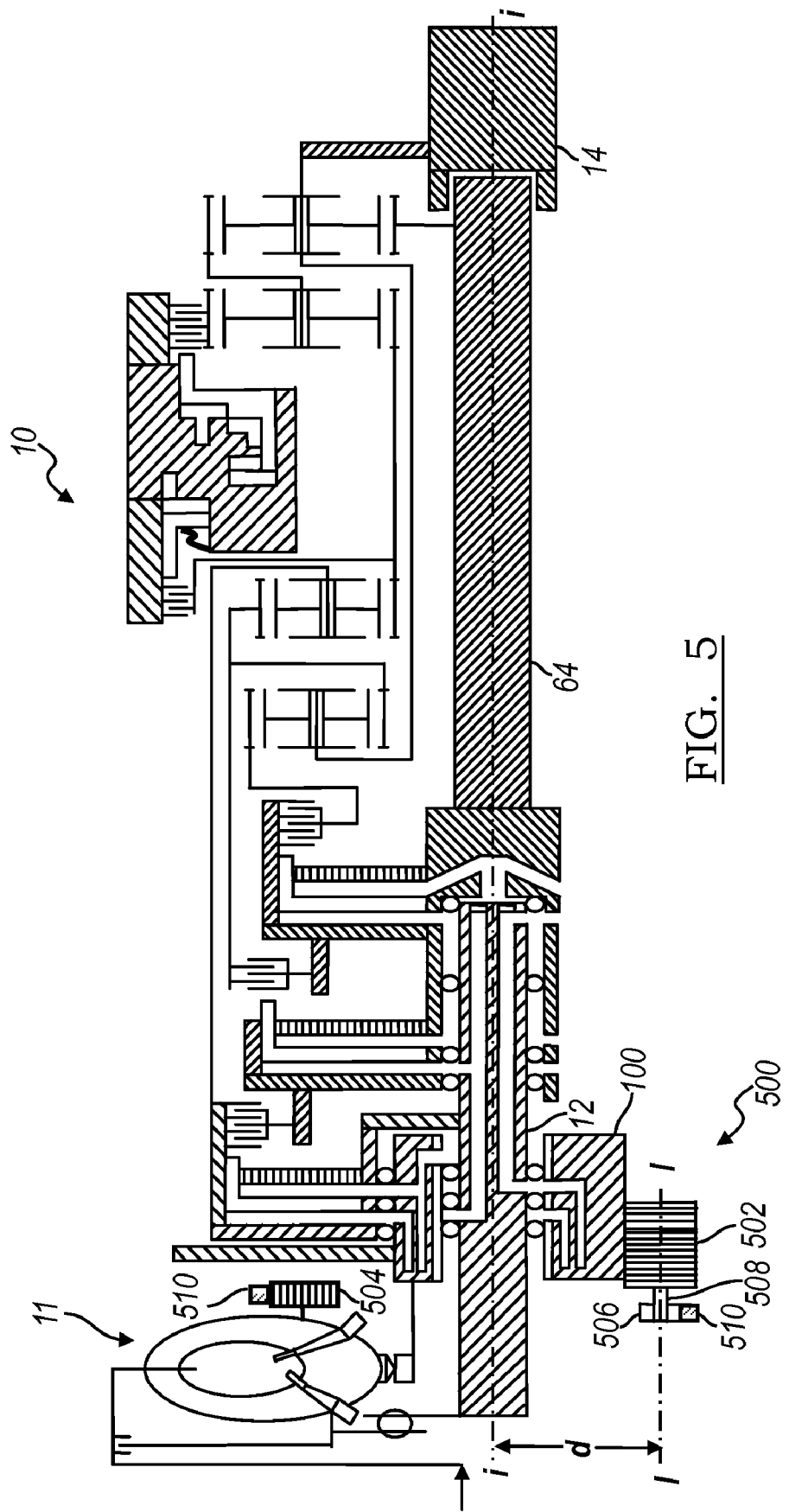
FIG. 5 is a schematic view of an embodiment of an eight speed transmission according to the present invention showing an off-axis hydraulic fluid pump.

Referring now to FIG. 5, a cross section of the transmission 10 including an off-axis fluid pump assembly 500 is illustrated and will now be described. Off-axis fluid pump assembly 500 includes a transmission fluid pump 502, a drive gear or pulley member 504, a driven gear or pulley member 506, a pump shaft 508 and a chain or belt 510. The transmission fluid pump 502 is fixedly attached to the transmission housing 100 or a similar stationary member along an axis "l" that is offset a predefined radial distance "d" from the axis "i" of the input shaft 12. The drive gear or pulley member 504 is fixedly attached for common rotation with the torque converter 11. The driven gear or pulley member 506 is fixedly connected for common rotation with the pump shaft 508. The chain or belt 510 engages both the drive gear or pulley member 504 and the driven gear or pulley member 506 to transfer driving torque from the input shaft 12 to the pump shaft 508. The pump shaft 508 transfers the driving torque produced in the chain or belt 510 to fluid pump 502. A stepped ratio may be used between the drive gear or pulley member 504 and the driven gear or pulley member 506 to reduce the amount of energy transferred to the transmission fluid pump 502 thus resulting in a more efficient transmission 10. The fluid pump assembly 500 provides fluid pressure and flow for transmission 10 function. Driving the fluid pump assembly 500 by a ratio connection allows the transmission 10 to more efficiently provide fluid pressure and flow.

The description of the invention is merely exemplary in nature and variations that do not depart from the gist of the invention are intended to be within the scope of the invention. Such variations are not to be regarded as a departure from the spirit and scope of the invention.

What is claimed is:

1. A multi-speed transmission comprising:
   a transmission housing having a center support and a front support, the center support including a first apply fluid passage, a second apply fluid passage, a third apply fluid passage, and a first dam fluid passage, and wherein the front support includes a fourth apply fluid passage and a second dam fluid passage;
   a first, a second, a third, and a fourth planetary gear set sets each having a first, a second, and a third member
   five torque-transmitting mechanisms each having a first apply chamber and a piston for selectively interconnecting at least one of the first, second, and third members of the planetary gear sets with at least one other of the first members, second members, and third members of the planetary gear sets, and the transmission housing, and wherein the first apply fluid passage is in communication with the first apply chamber of the first of the five torque-transmitting mechanisms, the second apply fluid passage is in communication with a second apply chamber of the first of the five torque-transmitting mechanisms, the first dam fluid passage is in communication with a dam chamber of the first of the five torque-transmitting mechanisms, the third apply fluid passage is in communication with the first apply chamber of the second of the five torque-transmitting mechanisms, the fourth apply fluid passage is in communication with the first apply chamber of the third of the five torque-transmitting mechanisms, and the second dam fluid passage is in communication with a dam chamber of the third of the five torque-transmitting mechanisms;
an input member continuously interconnected to the second member of the second planetary gear set, the input member having:
  a first, a second, and a third bore disposed parallel to a longitudinal axis of the input member;
  a first input port in communication with the first bore and a second input port in communication with the third bore
  a first and second dam port in communication with the second bore;
  a first apply port in communication with the first bore; and
  a second apply port in communication with the third bore;
an output member continuously interconnected to at least one of the second member of the fourth planetary gear set and the second member of the third planetary gear set;
an intermediate member rotatably fixed to the first member of the fourth planetary gear set, the intermediate member having:
  an intermediate bore in communication with the second bore of the input shaft;
  a first apply side port in communication with the first apply chamber of the fourth of the five torque-transmitting mechanisms;
  a second apply side port in communication with the first apply chamber of the fifth of the five torque-transmitting mechanisms;
  a first dam side port in communication with the dam chamber of the fourth of the five torque-transmitting mechanisms; and
  a second dam side port in communication with the dam chamber of the fifth of the five torque-transmitting mechanisms and the intermediate bore;
a first interconnecting member continuously interconnecting the first member of the first planetary gear set with the first member of the second planetary gear set;
a second interconnecting member continuously interconnecting the second member of the first planetary gear set with the third member of the fourth planetary gear set;
a third interconnecting member continuously interconnecting the third member of the second planetary gear set with the first member of the third planetary gear set; and
a fourth interconnecting member continuously interconnecting the second member of the third planetary gear set with the second member of the fourth planetary gear set.

2. The multi-speed transmission of claim 1 wherein;
the first of the five torque-transmitting mechanisms is selectively engageable to interconnect the third member of the first planetary gear set with the stationary element;
the second of the five torque-transmitting mechanisms is selectively engageable to interconnect at least one of the first member of the first planetary gear set and the first member of the second planetary gear set with the stationary element;
the third of the five torque-transmitting mechanisms is selectively engageable to interconnect at least one of the second member of the second planetary gear set and the input member with the first member of the fourth planetary gear set;
the fourth of the five torque-transmitting mechanisms is selectively engageable to interconnect at least one of the third member of the second planetary gear set and the first member of the third planetary gear set with the first member of the fourth planetary gear set;
the fifth of the five torque-transmitting mechanisms is selectively engageable to interconnect the third member of the third planetary gear set with the first member of the fourth planetary gear set; and
wherein the five torque-transmitting mechanisms include a first and second brake and a first, a second, and a third clutch.

3. The multi-speed transmission of claim 1 further wherein the torque-transmitting mechanisms are selectively engageable in combinations of at least three to establish at least eight forward speed ratios and at least one reverse speed ratio between the input member and the output member.

4. The multi-speed transmission of claim 1 further comprising:
a sleeve shaft supported by the front support of the transmission housing;
a plurality of input member seals; and
a first annular channel, a second annular channel, and a third annular channel wherein the annular channels are defined by the inner surface of the sleeve shaft, the outer surface of the input member, and the plurality of input member seals, and
wherein the first annular channel communicates with the first input port, the second annular channel communicates with the second input port, and the third annular channel communicates with the first dam port and the second dam fluid passage of the front support.

5. The multi-speed transmission of claim 4 further comprising:
a plurality of intermediate member seals; and
a fourth annular channel, a fifth annular channel, and a sixth annular channel wherein the annular channels are defined by the outer, surface of the input member, the inner surface of the intermediate shaft, and the plurality of intermediate member seals; and
wherein the fourth annular channel communicates with the first apply port and the first apply side port of the intermediate member, the fifth annular channel communicates with the second dam port and the first dam side port of the intermediate member, and the sixth annular channel communicates with the second apply port and the second apply side port of the intermediate member.

6. The multi-speed transmission of claim 1 further comprising a hydraulic fluid pump fixed to the transmission housing and drivingly connected to at least one of a torque converter and an engine, the hydraulic fluid pump providing a pressurized hydraulic fluid to a hydraulic control system of the transmission.

7. The multi-speed transmission of claim 1 further comprising a first speed sensor assembly, a second speed sensor assembly, and a third speed sensor assembly each having a speed sensor fixed to the transmission housing and a speed sensor ring rotatably fixed to at least one of the interconnecting members, the input member, and the output member.

8. The multi-speed transmission of claim 6 wherein the first speed sensor assembly has a first speed sensor ring rotatably fixed to the input member, the second speed sensor assembly has a second speed sensor ring rotatably fixed to the second interconnecting member, and the third speed sensor assembly has a third speed sensor ring rotatably fixed to the output member.

9. A multi-speed transmission comprising:
a transmission housing having a center support and a front support, the center support including a first apply fluid passage, a second apply fluid passage, a third apply fluid passage, and a first dam fluid passage, and wherein the front support includes a fourth apply fluid passage and a second dam fluid passage;
a first, a second, a third, and a fourth planetary gear set each having a first, a second, and a third member
five torque-transmitting mechanisms each having a first apply chamber and a piston for selectively interconnecting at least one of the first, second, and third members of the planetary gear sets with at least one other of the first members, second members, and third members of the planetary gear sets, and the transmission housing, and wherein the first apply fluid passage is in communication with the first apply chamber of the first of the five torque-transmitting mechanisms, the second apply fluid passage is in communication with a second apply chamber of the first of the five torque-transmitting mechanisms, the first dam fluid passage is in communication with a dam chamber of the first of the five torque-transmitting mechanisms, the third apply fluid passage is in communication with the first apply chamber of the second of the five torque-transmitting mechanisms, the fourth apply fluid passage is in communication with the first apply chamber of the third of the five torque-transmitting mechanisms, and the second dam fluid passage is in communication with the dam chamber of the third of the five torque-transmitting mechanisms;
an input member continuously interconnected to the second member of the second planetary gear set;
an output member continuously interconnected to at least one of the second member of the fourth planetary gear set and the second member of the third planetary gear set;
an intermediate member rotatably fixed to the first member of the fourth planetary gear set;
a first interconnecting member continuously interconnecting the first member of the first planetary gear set with the first member of the second planetary gear set;
a second interconnecting member continuously interconnecting the second member of the first planetary gear set with the third member of the fourth planetary gear set;
a third interconnecting member continuously interconnecting the third member of the second planetary gear set with the first member of the third planetary gear set; and
a fourth interconnecting member continuously interconnecting the second member of the third planetary gear set with the second member of the fourth planetary gear set.

10. The multi-speed transmission of claim 9 wherein;
the first of the five torque-transmitting mechanisms is selectively engageable to interconnect the third member of the first planetary gear set with the stationary element;
the second of the five torque-transmitting mechanisms is selectively engageable to interconnect at least one of the first member of the first planetary gear set and the first member of the second planetary gear set with the stationary element;
the third of the five torque-transmitting mechanisms is selectively engageable to interconnect at least one of the second member of the second planetary gear set and the input member with the first member of the fourth planetary gear set;
the fourth of the five torque-transmitting mechanisms is selectively engageable to interconnect at least one of the third member of the second planetary gear set and the first member of the third planetary gear set with the first member of the fourth planetary gear set;
the fifth of the five torque-transmitting mechanisms is selectively engageable to interconnect the third member of the third planetary gear set with the first member of the fourth planetary gear set; and
wherein the five torque-transmitting mechanisms include a first and second brake and a first, a second, and a third clutch.

11. The multi-speed transmission of claim 9 further wherein the torque-transmitting mechanisms are selectively engageable in combinations of at least three to establish at least eight forward speed ratios and at least one reverse speed ratio between the input member and the output member.

12. The multi-speed transmission of claim 9 further comprising:
a sleeve shaft supported by the front support of the transmission housing;
a plurality of input member seals; and
a first annular channel, a second annular channel, and a third annular channel wherein the annular channels are defined by the inner surface of the sleeve shaft, the outer surface of the input member, and the plurality of input member seals;
wherein the input member further comprises:
a first, a second, and a third bore disposed parallel to a longitudinal axis of the input member;
a first input port in communication with the first bore and a second input port in communication with the third bore
a first and second dam port in communication with the second bore;
a first apply port in communication with the first bore; and
a second apply port in communication with the third bore;
and
wherein the first annular channel communicates with the first input port, the second annular channel communicates with the second input port, and the third annular channel communicates with the first dam port and the second dam fluid passage of the front support.

13. The multi-speed transmission of claim 12 further comprising:
a plurality of intermediate member seals; and
a fourth annular channel, a fifth annular channel, and a sixth annular channel wherein the annular channels are defined by the outer surface of the input member, the inner surface of the intermediate shaft, and the plurality of intermediate member seals;
wherein the intermediate member further comprises:
an intermediate bore in communication with the second bore of the input shaft;
a first apply side port in communication with the first apply chamber of the fourth of the five torque-transmitting mechanisms;

a second apply side port in communication with the first apply chamber of the fifth of the five torque-transmitting mechanisms; and a first dam side port in communication with the dam chamber of the fourth of the five torque-transmitting mechanisms; and a second dam side port in communication with the dam chamber of the fifth of the five torque-transmitting mechanisms and the intermediate bore; and wherein the fourth annular channel communicates with the first apply port and the first apply side port of the intermediate member, the fifth annular channel communicates with the second dam port and the first dam side port of the intermediate member, and the sixth annular channel communicates with the second apply port and the second apply side port of the intermediate member.

14. The multi-speed transmission of claim 9 further comprising a hydraulic fluid pump fixed to the transmission housing and drivingly connected to at least one of a torque converter and an engine, the hydraulic fluid pump providing a pressurized hydraulic fluid to a hydraulic control system of the transmission.

15. The multi-speed transmission of claim 9 further comprising a first speed sensor assembly, a second speed sensor assembly, and a third speed sensor assembly each having a speed sensor fixed to the transmission housing and a speed sensor ring rotatably fixed to at least one of the interconnecting members, the input member, and the output member.

16. The multi-speed transmission of claim 15 wherein the first speed sensor assembly has a first speed sensor ring rotatably fixed to the input member, the second speed sensor assembly has a second speed sensor ring rotatably fixed to the second interconnecting member, and the third speed sensor assembly has a third speed sensor ring rotatably fixed to the output member.

17. A multi-speed transmission comprising:

a transmission housing having a center support and a front support, the center support including a first apply fluid passage, a second apply fluid passage, a third apply fluid passage, and a first dam fluid passage, and wherein the front support includes a fourth apply fluid passage and a second dam fluid passage;

a first, a second, a third, and a fourth planetary gear set sets each having a first, a second, and a third member five torque-transmitting mechanisms each having a first apply chamber and a piston for selectively interconnecting at least one of the first, second, and third members of the planetary gear sets with at least one other of the first members, second members, and third members of the planetary gear sets, and the transmission housing, and wherein the first apply fluid passage is in communication with the first apply chamber of the first of the five torque-transmitting mechanisms, the second apply fluid passage is in communication with a second apply chamber of the first of the five torque-transmitting mechanisms, the first dam fluid passage is in communication with a dam chamber of the first of the five torque-transmitting mechanisms, the third apply fluid passage is in communication with the first apply chamber of the second of the five torque-transmitting mechanisms, the fourth apply fluid passage is in communication with the first apply chamber of the third of the five torque-transmitting mechanisms, and the second dam fluid passage is in communication with the dam chamber of the third of the five torque-transmitting mechanisms;

an input member continuously interconnected to the second member of the second planetary gear set;

an output member continuously interconnected to at least one of the second member of the fourth planetary gear set and the second member of the third planetary gear set;

an intermediate member rotatably fixed to the first member of the fourth planetary gear set;

a hydraulic fluid pump fixed to the transmission housing and drivingly connected to at least one of a torque converter and an engine, the hydraulic fluid pump providing a pressurized hydraulic fluid to a hydraulic control system of the transmission;

a first interconnecting member continuously interconnecting the first member of the first planetary gear set with the first member of the second planetary gear set;

a second interconnecting member continuously interconnecting the second member of the first planetary gear set with the third member of the fourth planetary gear set;

a third interconnecting member continuously interconnecting the third member of the second planetary gear set with the first member of the third planetary gear set; and a fourth interconnecting member continuously interconnecting the second member of the third planetary gear set with the second member of the fourth planetary gear set;

a first speed sensor assembly, a second speed sensor assembly, and a third speed sensor assembly wherein the first speed sensor assembly has a first speed sensor ring rotatably fixed to the input member, the second speed sensor assembly has a second speed sensor ring rotatably fixed to the second interconnecting member, and the third speed sensor assembly has a third speed sensor ring rotatably fixed to the output member.

18. The multi-speed transmission of claim 17 wherein;

the first of the five torque-transmitting mechanisms is selectively engageable to interconnect the third member of the first planetary gear set with the stationary element;

the second of the five torque-transmitting mechanisms is selectively engageable to interconnect at least one of the first member of the first planetary gear set and the first member of the second planetary gear set with the stationary element;

the third of the five torque-transmitting mechanisms is selectively engageable to interconnect at least one of the second member of the second planetary gear set and the input member with the first member of the fourth planetary gear set;

the fourth of the five torque-transmitting mechanisms is selectively engageable to interconnect at least one of the third member of the second planetary gear set and the first member of the third planetary gear set with the first member of the fourth planetary gear set;

the fifth of the five torque-transmitting mechanisms is selectively engageable to interconnect the third member of the third planetary gear set with the first member of the fourth planetary gear set; and wherein the five torque-transmitting mechanisms include a first and second brake and a first, a second, and a third clutch; and wherein the torque-transmitting mechanisms are selectively engageable in combinations of at least three to establish at least eight forward speed ratios and at least one reverse speed ratio between the input member and the output member.

19. The multi-speed transmission of claim 17 further comprising:

a sleeve shaft supported by the front support of the transmission housing;

a plurality of input member seals; and a first annular channel, a second annular channel, and a third annular channel wherein the annular channels are defined by the inner surface of the sleeve shaft, the outer surface of the input member, and the plurality of input member seals;

wherein the input member further comprises:

a first, a second, and a third bore disposed parallel to a longitudinal axis of the input member;

a first input port in communication with the first bore and a second input port in communication with the third bore a first and second dam port in communication with the second bore;

a first apply port in communication with the first bore; and a second apply port in communication with the third bore;

and wherein the first annular channel communicates with the first input port, the second annular channel communicates with the second input port, and the third annular channel communicates with the first dam port and the second dam fluid passage of the front support.

20. The multi-speed transmission of claim 19 further comprising:

a plurality of intermediate member seals; and a fourth annular channel, a fifth annular channel, and a sixth annular channel wherein the annular channels are defined by the outer surface of the input member, the inner surface of the intermediate shaft, and the plurality of intermediate member seals;

wherein the intermediate member further comprises:

an intermediate bore in communication with the second bore of the input shaft;

a first apply side port in communication with the first apply chamber of the fourth of the five torque-transmitting mechanisms;

a second apply side port in communication with the first apply chamber of the fifth of the five torque-transmitting mechanisms; and a first dam side port in communication with the dam chamber of the fourth of the five torque-transmitting mechanisms; and a second dam side port in communication with the dam chamber of the fifth of the five torque-transmitting mechanisms and the intermediate bore; and wherein the fourth annular channel communicates with the first apply port and the first apply side port of the intermediate member, the fifth annular channel communicates with the second dam port and the first dam side port of the intermediate member, and the sixth annular channel communicates with the second apply port and the second apply side port of the intermediate member.

* * * * *